US009979100B2

(12) United States Patent
Omori et al.

(10) Patent No.: US 9,979,100 B2
(45) Date of Patent: May 22, 2018

(54) GROUND TERMINAL FITTING

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Yasuo Omori, Mie (JP); Kohei Takagi, Mie (JP); Masaaki Tabata, Mie (JP)

(73) Assignees: AUTONETWORKS TECHNOLOGIES, LTD. (JP); SUMITOMO WIRING, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 0 days. days.

(21) Appl. No.: 15/518,006

(22) PCT Filed: Oct. 6, 2015

(86) PCT No.: PCT/JP2015/078258
§ 371 (c)(1),
(2) Date: Apr. 10, 2017

(87) PCT Pub. No.: WO2016/067845
PCT Pub. Date: May 6, 2016

(65) Prior Publication Data
US 2017/0310022 A1    Oct. 26, 2017

(30) Foreign Application Priority Data

Oct. 27, 2014 (JP) ................... 2014-218064

(51) Int. Cl.
*H01R 4/34* (2006.01)
*H01R 4/64* (2006.01)
*H01M 2/30* (2006.01)

(52) U.S. Cl.
CPC ............... *H01R 4/34* (2013.01); *H01R 4/646* (2013.01); *H01M 2/30* (2013.01)

(58) Field of Classification Search
CPC ...... H01R 4/185; H01R 4/188; H01R 13/639; H01R 4/20; H01R 2103/00; H01R 13/44;
(Continued)

(56) References Cited

U.S. PATENT DOCUMENTS 5,586,899 A    12/1996    Okada
6,783,377 B2 *  8/2004    Aoyama ................ H01R 11/12
                                                                     439/92
(Continued)

FOREIGN PATENT DOCUMENTS

JP    50-81992    7/1975
JP    63-146969   9/1988
(Continued)

OTHER PUBLICATIONS

International Search Report dated Nov. 10, 2015.

*Primary Examiner* — Truc Nguyen
(74) *Attorney, Agent, or Firm* — Gerald E. Hespos; Michael J. Porco; Matthew T. Hespos

(57) ABSTRACT

It is aimed to provide a ground terminal fitting suitably connectable to each of various wires. A ground terminal fitting includes a bolt fastening portion (10) to be bolted to a ground part and a wire connecting portion (20) to be connected to an end part of a wire (30). The bolt fastening portion (10) and the wire connecting portion (20) are coupled after being separately formed. According to this configuration, since the wire connecting portion (20) can be formed of an optimal material into an optimal shape, the wire connecting portion can be suitably connected to each of various wires (30).

5 Claims, 6 Drawing Sheets

(58) Field of Classification Search
CPC ...... H01R 13/514; H01R 31/06; H01R 4/184; H01R 13/6658; H01R 13/71; H01R 2201/26; H01R 27/00; H01R 31/065; H01R 43/048

See application file for complete search history.

(56) References Cited

U.S. PATENT DOCUMENTS

| | | | |
|---|---|---|---|
| 6,960,723 B2* | 11/2005 | Fujii | H01R 11/12 174/84 C |
| 7,140,928 B1* | 11/2006 | Jacques | H01R 13/20 439/290 |
| 7,160,157 B1* | 1/2007 | Jones, III | H01R 11/01 439/288 |
| 7,896,715 B2* | 3/2011 | Kumakura | H01R 4/185 439/442 |
| 8,998,659 B2* | 4/2015 | Sato | H01R 4/185 439/606 |
| 2006/0205289 A1 | 9/2006 | Kumakura | |
| 2008/0032548 A1* | 2/2008 | Shigehisa | H01R 4/185 439/516 |
| 2010/0197179 A1* | 8/2010 | Miyamoto | H01R 4/646 439/877 |
| 2013/0231013 A1 | 9/2013 | Sato et al. | |
| 2014/0342621 A1* | 11/2014 | Omori | H01R 11/09 439/878 |
| 2015/0079825 A1 | 3/2015 | Miyamoto et al. | |
| 2016/0079684 A1* | 3/2016 | Naganishi | H01R 11/12 439/877 |
| 2016/0329644 A1* | 11/2016 | Tabata | H01R 11/05 |

FOREIGN PATENT DOCUMENTS

| | | |
|---|---|---|
| JP | 7-245135 | 9/1995 |
| JP | 2004-111058 | 4/2004 |
| JP | 2006-269150 | 10/2006 |
| JP | 2008-176970 | 7/2008 |
| JP | 2010-123291 | 6/2010 |
| JP | 2014-117075 | 6/2014 |
| JP | 2014-170683 | 9/2014 |
| WO | 2012/046762 | 4/2012 |
| WO | 2013/137429 | 9/2013 |

* cited by examiner

GROUND TERMINAL FITTING

BACKGROUND

1. Field of the Invention

The present invention relates to a ground terminal fitting.

2. Description of the Related Art

Japanese Unexamined Patent Publication No. 2014-170683 discloses a ground terminal fitting that is connected to an end part of a wire and to a predetermined ground part by bolting. This ground terminal fitting is formed internally with a bolt fastening portion to be bolted to the ground part and a wire connecting portion to be connected to the end part of the wire by machining a single metal plate material.

Various types of wires including those differing in diameter and differing in core material are used. Accordingly, it is desirable to form a wire connecting portion of an optimal material into a shape optimal for each wire in order to suitably connect a ground terminal fitting as described above to each of different types of wires. For example, it is desirable to form a wire connecting portion of a thin plate material if a wire has a small diameter. However, it is not desirable in terms of strength and the like to form the entire ground terminal fitting of a thin plate material. Further, if a material optimal for the connection of a wire is expensive, it is not preferable in terms of material cost to form the entire ground terminal fitting of such an expensive material. Therefore, it has been difficult to connect the ground terminal fitting suitably to each of various wires.

The present invention was completed based on the above situation and aims to provide a ground terminal fitting suitably connectable to each of various wires.

SUMMARY

The invention is directed to a ground terminal fitting with a bolt fastening portion to be bolted to a ground part and a wire connecting portion to be connected to an end part of a wire. The bolt fastening portion and the wire connecting portion are coupled after being formed separately.

The ground terminal fitting may be configured so that the bolt fastening portion and the wire connecting portion are couplable regardless of whether the bolt fastening portion and the wire connecting portion are formed of the same metal material or formed of different metal materials. Accordingly to this configuration, the wire connecting portion can be formed of an optimal material, and the wire connecting portion can be suitably connected to each of various wires.

The ground terminal fitting may be configured so that the wire connecting portion formed into an optimal shape according to a diameter of the wire is coupled to the bolt fastening portion. According to this configuration, the ground terminal fitting can be connected suitably to each of various wires since the wire connecting portion can be formed into an optimal shape.

The ground terminal fitting may be configured so that the bolt fastening portion includes a protrusion projecting toward the ground part. According to this configuration, the wire connecting portion is lifted from the ground part by the contact of the protrusion provided on the bolt fastening portion with the ground part. Thus, a space for a water stopping member, such as a heat shrinkable tube, can be provided, for example, below the wire connecting portion.

The ground terminal fitting of the invention may be such that a plurality of coupling portions to the wire connecting portion are provided on the bolt fastening portion. According to this configuration, a wire pull-out path can be optimized by selecting the coupling position of the wire connecting portion.

According to the invention, for example, if the wire has a small diameter, the wire connecting portion can be formed of a thin plate material and the bolt fastening portion can be formed of a plate material having a predetermined thickness to ensure strength. Further, for example, if a material optimal for the connection of the wire is expensive, an increase of material cost can be suppressed by forming the wire connecting portion of such an expensive material and forming the bolt fastening portion of a relatively inexpensive material. Specifically, since the wire connecting portion can be formed of an optimal material into an optimal shape, the wire connecting portion can be connected suitably to each of various wires.

DETAILED DESCRIPTION

One specific embodiment of the invention is described in detail with reference to FIGS. 1 to 5.

Figure 1:
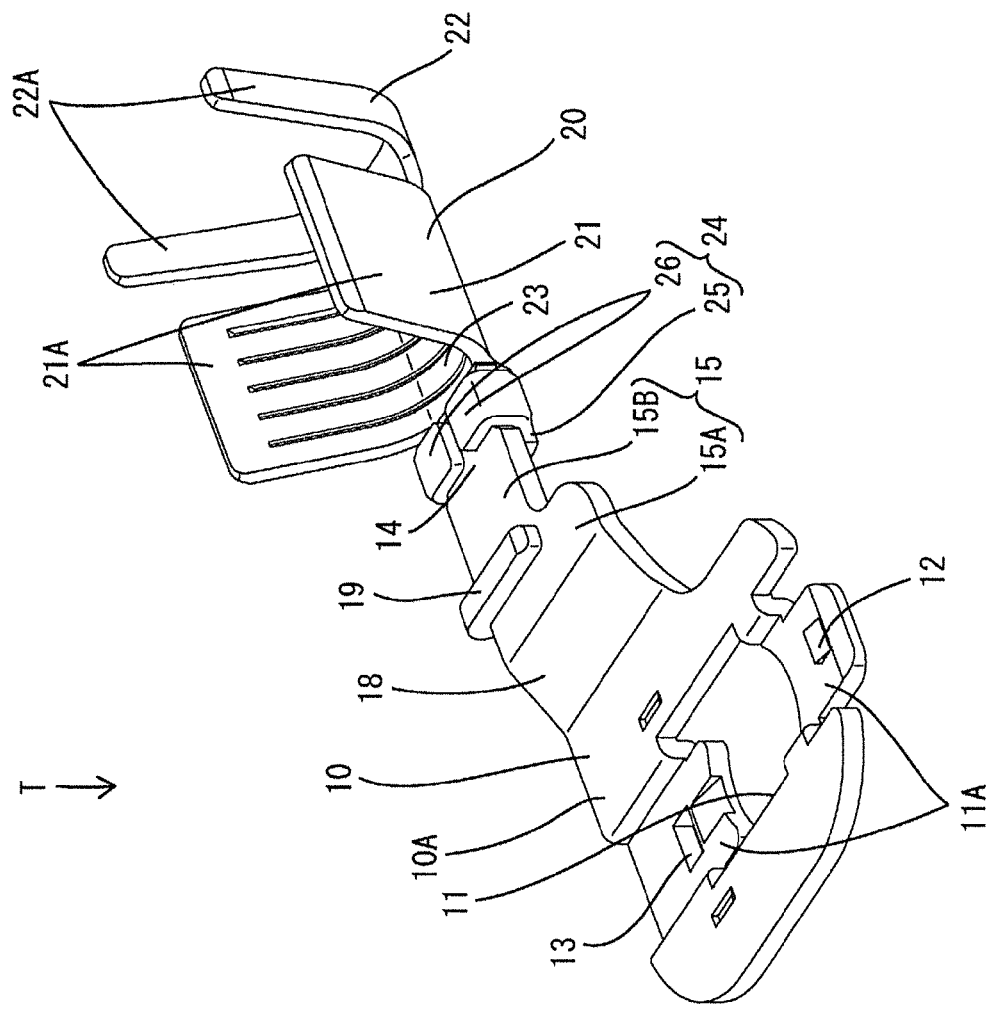
FIG. 1 is a perspective view of a ground terminal fitting in a first embodiment showing a state where a bolt fastening portion and a wire connecting portion are coupled.

A ground terminal fitting T in this embodiment is connected to an end part of a wire 30 and grounded, for example, by being connected to a predetermined ground part on a body of an automotive vehicle by bolting. In the following description, a left-front side, a right-back side, an upper side and a lower side of FIG. 1 are referred to as a front side, a rear side, an upper side and a lower side in each constituent member.

The ground terminal fitting T includes a bolt fastening portion 10 to be bolted to the ground part and a wire connecting portion 20 to be connected to the end part of the wire 30. The bolt fastening portion 10 and the wire connecting portion 20 are coupled and integrated after being formed separately. The bolt fastening portion 10 and the wire connecting portion 20 are formed by properly press-working a metal plate material.

The bolt fastening portion 10 is configured similar to an existing ground terminal fitting that can be assembled to overlap with another unillustrated ground terminal fitting. The bolt fastening portion 10 includes a body 10A substantially rectangular, and a bolt insertion hole 11 is open in a center of the body 10A. Parts of the body 10A at both left and right sides of the bolt insertion hole 11 are provided with protrusions 11A that project slightly more down than parts in front of and behind them. This protrusion 11A is provided with a locking claw 12 and a locking hole 13 lockable to the corresponding ones of the other ground terminal fitting to be overlapped.

The bolt fastening portion 10 is provided with a fastening-side coupling portion 14 to which the wire connecting portion 20 is to be coupled. The fastening-side coupling portion 14 is provided on a tip of an extending portion 15 extending out from the outer peripheral edge of the body 10A.

The extending portion 15 extends rearward substantially perpendicularly from the rear edge of the body 10A. The extending portion 15 is connected to one lateral side of the body 10A.

A width of the extending portion 15 is changed from the side of the body 10A toward a tip in an extending direction in a step-wise manner to have two different widths. A part of the extending portion 15 on the side of the body 10A defines a large width portion 15A having a large width and a part on a tip side of the extending portion 15 defines a small width portion 15B having a small width. The large width portion 15A has substantially half the width of the body 10A.

The large width portion 15A is formed with a step 18 so that the small width portion 15B is slightly above the body 10A.

A prevention wall 19 for preventing the intrusion of an adhesive for bonding an unillustrated heat shrinkable tube surrounding the end part of the wire 30 toward the side of the body 10A is provided in a part of the large width portion 15A behind the step 18. The prevention wall 19 extends in a lateral direction up to a side edge on an upper surface side of the extending portion 15 and closes a front side of the small width portion 15B over substantially the entire width. It can be prevented by this prevention wall 19 that the adhesive intrudes to the side of the body 10A to obstruct a bolting operation.

Figure 2:
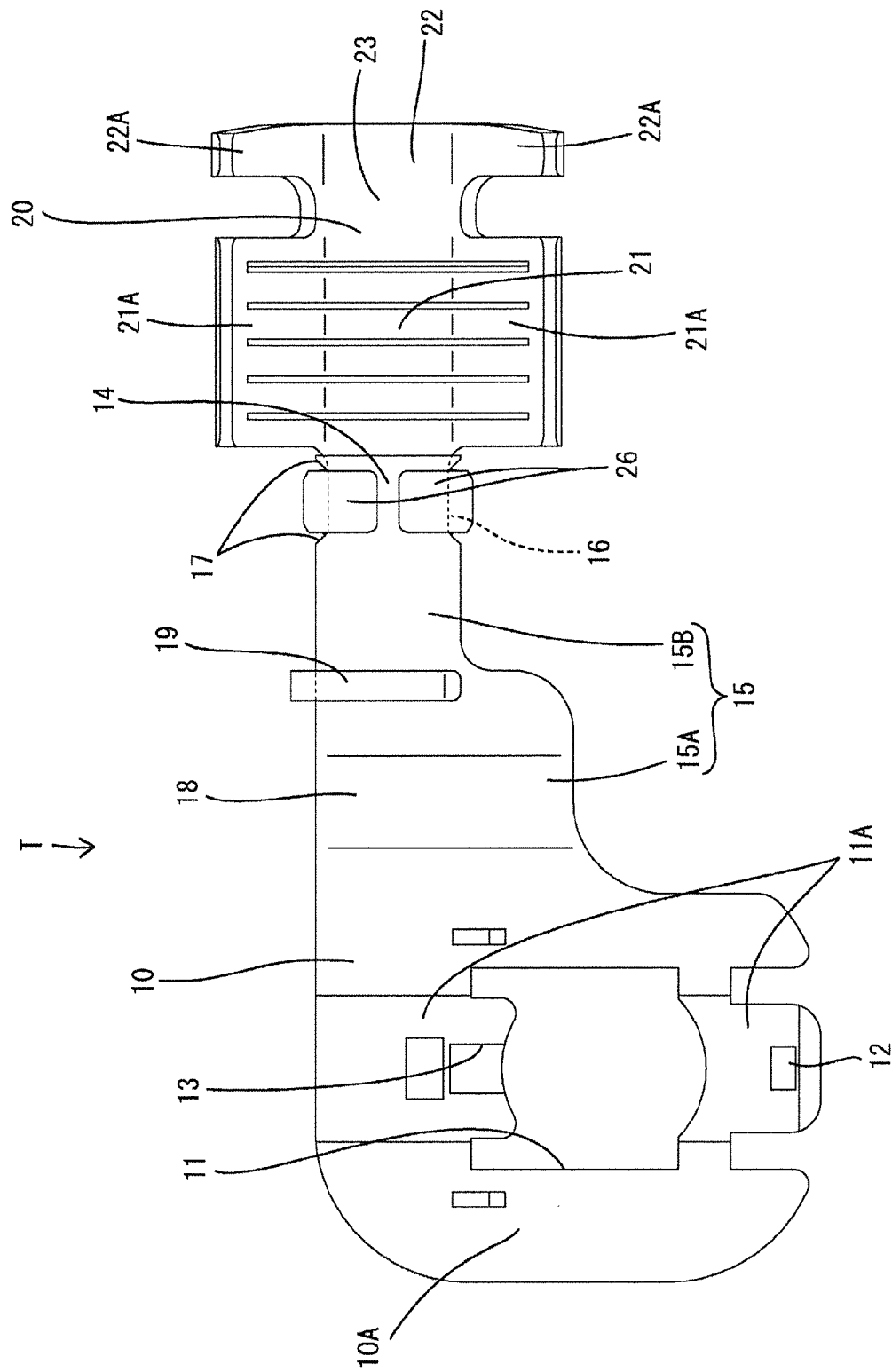
FIG. 2 is a plan view of the ground terminal fitting in the state where the bolt fastening portion and the wire connecting portion are coupled.

The tip part (rear end part) of the extending portion 15 is provided with the fastening-side coupling portion 14 (see FIG. 2). Relatively shallow (having a smaller recessed dimension than a dimension in a front-rear direction) recesses 16 are formed on both side edges of the fastening-side coupling portion 14. Inclined portions 17 are formed on both front and rear end parts of each recess 16 and are inclined to be more separated from each other toward an outer side. A dimension in the front-rear direction of the recess 16, excluding the inclined portions 17, is equivalent to a dimension in the front-rear direction of sandwiching portions 26 to be described later.

Figure 5:
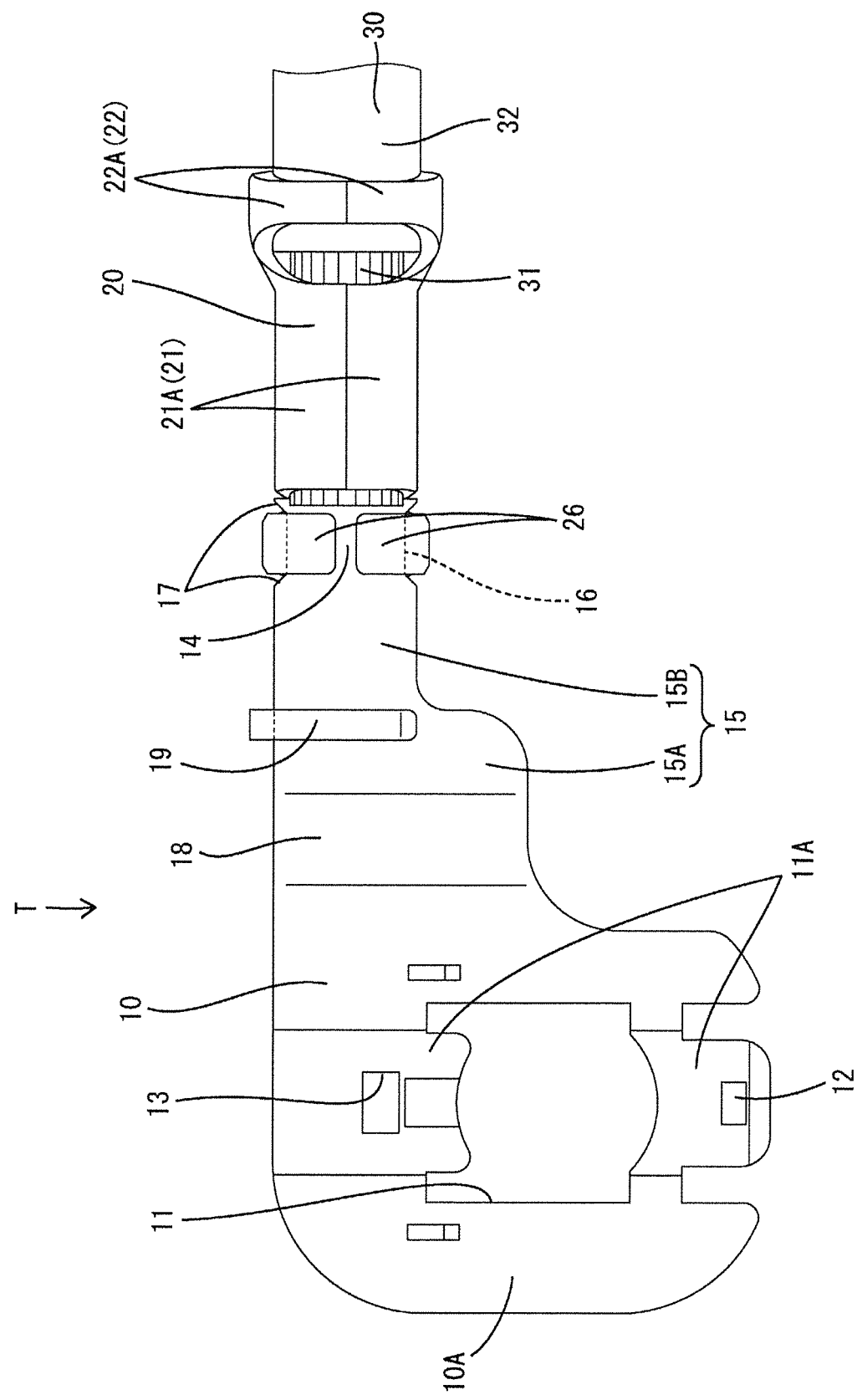
FIG. 5 is a plan view showing a state where the ground terminal fitting is connected to a wire.

The wire connecting portion 20 includes a core crimping portion 21 to be crimped to a core 31 of the wire 30 and a coating crimping portion 22 to be crimped to an insulation coating 32 (see FIG. 5). The core crimping portion 21 and the coating crimping portion 22 respectively include a pair of core crimping pieces 21A and a pair of coating crimping pieces 22A projecting from both side edges of a bottom plate, 23 as shown in FIG. 1. Further, the coating crimping pieces 22A have a longer length (projecting dimension from the bottom plate 23) than the core crimping pieces 21A. The core crimping pieces 21A and the coating crimping pieces 22A are caulked for respectively embracing the core 31 and the insulation coating 32 of the wire 30 placed on the bottom plate 23.

Figure 3:
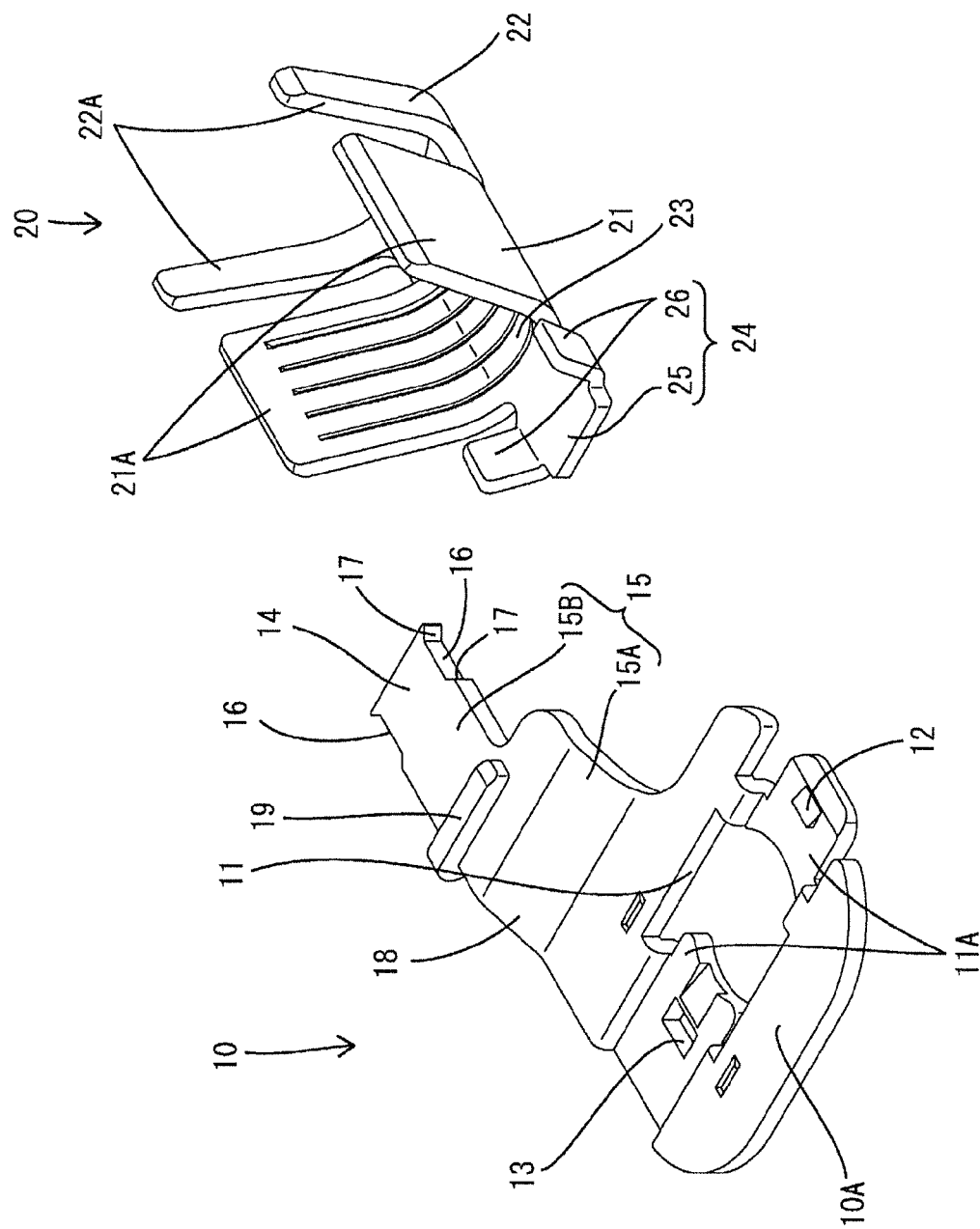
FIG. 3 is a perspective view showing a state before the bolt fastening portion and the wire connecting portion are coupled.
Figure 4:
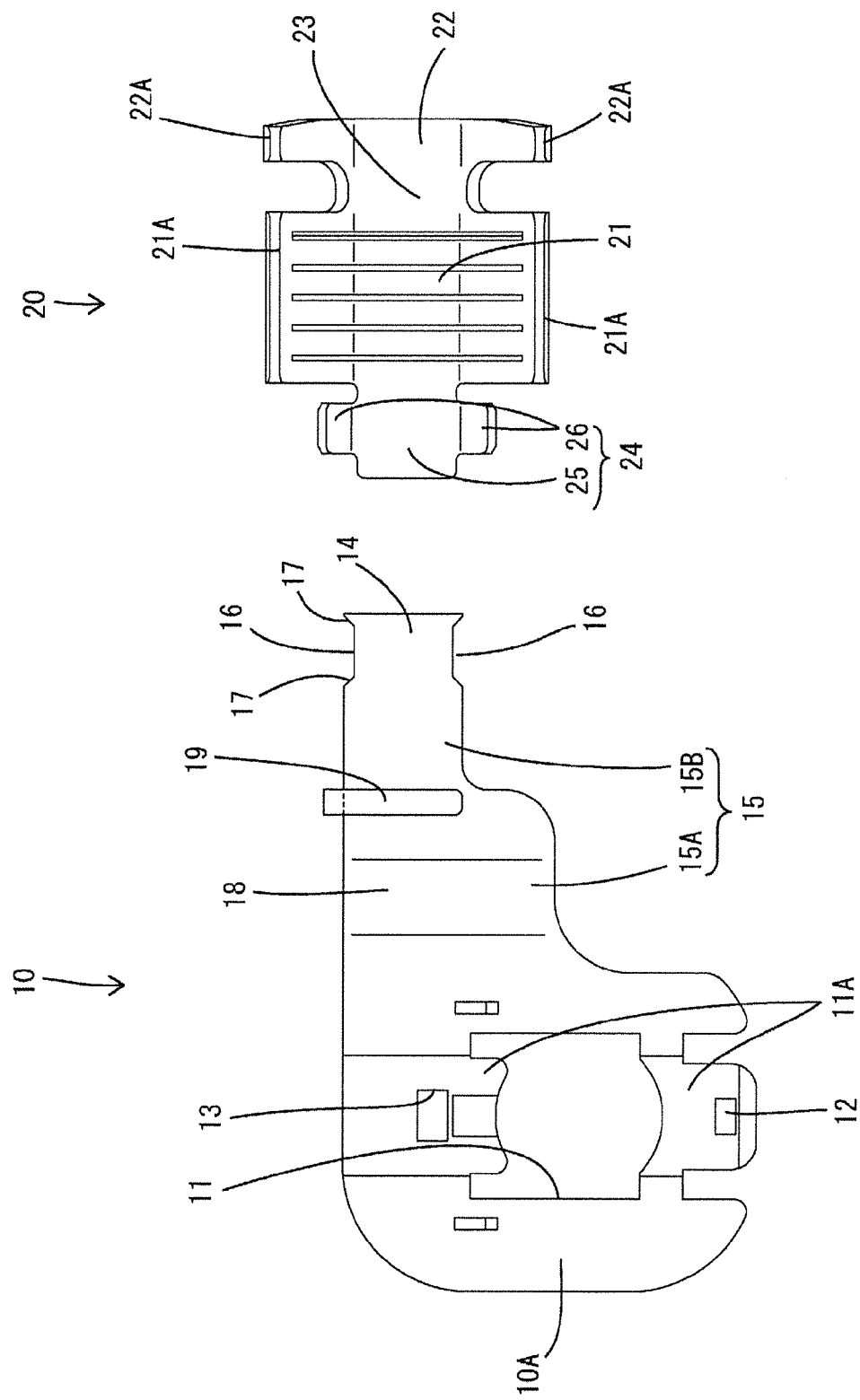
FIG. 4 is a plan view showing the state before the bolt fastening portion and the wire connecting portion are coupled.

A wire-side coupling portion 24 to be coupled to the fastening-side coupling portion 14 is provided in a front end part of the wire connecting portion 20. As shown in FIG. 3, the front end of the wire-side coupling portion 24 includes a projecting portion 25 of the bottom plate 23 projecting forward from the core coupling portion 21, and a pair of sandwiching portions 26 provided on both left and right edges of the projecting portion 25. As shown in FIG. 1, the wire-side coupling portion 24 and the fastening-side coupling portion 14 are joined by welding in a state where the fastening-side coupling portion 14 is overlapped on the upper surface of the projecting portion 25 and the sandwiching portions 26 embrace the fastening-side coupling portion 14 from opposite sides. Note that a clearance is defined between the tips of the pair of sandwiching portions 26.

Each of the bolt fastening portion 10 and the wire connecting portion 20 can be formed of an optimal material into an optimal shape.

First, material cost can be suppressed by making the material of the bolt fastening portion 10 and that of the wire connecting portion 20 different. For example, by forming the wire connecting portion 20 of copper or copper alloy and forming the bolt fastening portion 10 of iron or iron alloy, the material cost can be suppressed by using a material less expensive than copper as compared to the case where the entire ground terminal fitting is formed of copper or copper alloy.]

Further, by forming the wire connecting portion 20 of aluminum or aluminum alloy, electrolytic corrosion can be made less likely to occur in the case of connection to such a wire 30 that the core 31 formed of aluminum or aluminum alloy is coated with the insulation coating 32. At this time, performance capable of withstanding bolt fastening can be provided by forming the bolt fastening portion 10 of iron or iron alloy harder than aluminum. Further, since a potential difference between iron and aluminum is smaller than that between copper and aluminum, electrolytic corrosion can be made less likely to occur even if iron is brought into contact with aluminum or aluminum alloy.

Second, the wire connecting portion 20 optimally can be caulked to wires 30 having a large diameter and wires 30 having a small diameter by being appropriately changed in plate thickness and shape. For example, for the wire 30 having a small diameter, high connection quality can be ensured by using a relatively thin plate material, reducing a width of the bottom plate 23 to match the diameter of the wire 30 and making the core crimping pieces 21A and the coating crimping pieces 22A smaller. Further, the waste of the material can be eliminated by making the wire connecting portion 20 smaller according to the diameter. For the wire 30 having a large diameter, high connection quality can be ensured by using a relatively thick plate material, increasing the width of the bottom plate portion 23 to match the diameter of the wire 30 and making the core crimping pieces 21A and coating crimping pieces 22A larger. At this time, since the plate thickness and shape of the bolt fastening portion 10 can be set regardless of the wire connecting portion 20, the bolt fastening portion 10 may have the plate thickness and shape necessary for bolt fastening. In this way, connection quality to both the wire 30 and the ground part can be enhanced.

Next, functions and effects of the embodiment configured as described above are described.

The ground terminal fitting T of this embodiment includes the bolt fastening portion 10 to be bolted to the ground part and the wire connecting portion 20 to be connected to the end part of the wire 30, and the bolt fastening portion 11 and the wire connecting portion 12 are coupled after being separately formed.

According to this configuration, for example, if the wire 30 has a small diameter, the wire connecting portion 20 can be formed of a thin plate material and the bolt fastening portion 10 can be formed of a plate material having a predetermined thickness to ensure strength. Further, for example, if the material optimal for the connection of the wire 30 is expensive, an increase of the material cost can be suppressed by forming the wire connecting portion 20 of such an expensive material and forming the bolt fastening portion 10 of relatively inexpensive iron, iron alloy or the like. Specifically, since the wire connecting portion 20 can be formed of an optimal material into an optimal shape, the wire connecting portion 20 can be suitably connected to each of various wires 30.

Figure 6:
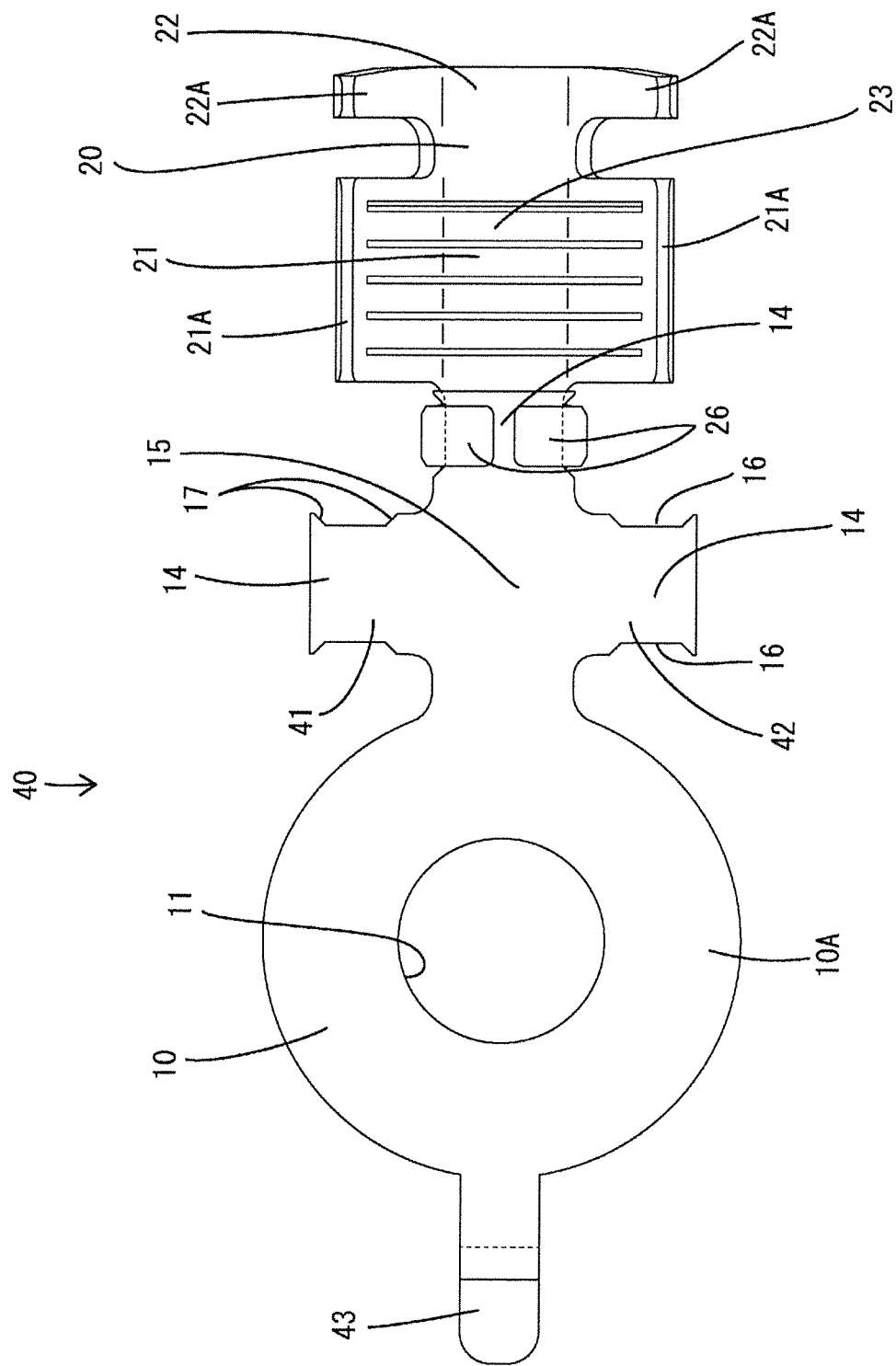
FIG. 6 is a plan view showing a ground terminal fitting in a second embodiment.

Next, a ground terminal fitting 40 according to a second embodiment of the invention is described with reference to FIG. 6.

The ground terminal fitting 40 of this embodiment differs from the first embodiment in that a bolt fastening portion 10 is provided with a plurality of fastening-side coupling portion 14. Note that components similar to those of the first embodiment are denoted by the same reference signs and repeated description is omitted.

As in the first embodiment, the ground terminal fitting 40 according to this embodiment includes the bolt fastening portion 10 to be bolted to a ground part and a wire connecting portion 20 to be connected to an end part of a wire 30, and the bolt fastening portion 10 and the wire connecting portion 20 are coupled after being formed separately. As in the first embodiment, the wire connecting portion 20 includes a core crimping portion 21 to be crimped to a core 31 of the wire 30, a coating crimping portion 22 to be crimped to an insulation coating 32 and a wire-side coupling portion 24 to be coupled to the fastening-side coupling portion 14.

The bolt fastening portion 10 includes a substantially circular body 10A formed with a substantially circular bolt insertion hole 11 in a center part, and the fastening-side couplings 14 are provided on an extending portion 15 extending out from the outer periphery of the body 10A. The fastening-side coupling portions 14 are provided at a total of three positions, i.e. on a tip part of the extending portion 15 in an extending direction, a tip part of a first branch 41 branched toward one side from the extending portion 15 and a tip part of a second branch 42 branched toward the other side from the extending portion 15. The first and second branch portions 41, 42 are branched in directions substantially perpendicular to the extending portion 15. As in the first embodiment, recesses 16 are formed on both side edges of each fastening-side coupling portion 14. The wire connecting portion 20 is coupled to the fastening-side coupling portion 14 appropriately selected according to the ground part and provided at an optimal position out of three fastening-side coupling portions 14.

Note that a rotation stopping portion 43 as a means for preventing corotation is formed on a side of the body 10A opposite to the extending portion 15. The rotation stopping portion 43 extends radially out from the outer peripheral edge of the body 10A in a direction opposite to the extending portion 15.

As described above, since the bolt fastening portion 10 and the wire connecting portion 20 are coupled after being separately formed in this embodiment, the wire connecting portion 20 can be formed of an optimal material into an optimal shape and, thus, suitably connected to each of various wires 30 as in the first embodiment.

Further, since the coupling portions to the wire connecting portion 20 are provided on the bolt fastening portion 10, a pull-out path of the wire 30 can be optimized by selecting the coupling position of the wire connecting portion 20.

The present is not limited to the above described and illustrated embodiments. For example, the following embodiments also are included in the scope of the invention.

Although the bolt fastening portion 10 and the wire connecting portion 20 are joined by welding in the above embodiments, there is no limitation to this and any means can be used to join the bolt fastening portion and the wire connecting portion.

Although specific examples of the materials and shapes of the bolt fastening portion 10 and the wire connecting portion 20 are shown in the above embodiments, the materials and shapes of the bolt fastening portion and the wire connecting portion are not limited to the above contents and can be appropriately changed and set.

Although the fastening-side coupling portions 14 are provided at three positions in the above second embodiment, there is no limitation to this and the positions and number of the fastening-side coupling portions can be appropriately changed.

LIST OF REFERENCE SIGNS

T, 40 . . . ground terminal fitting
10 . . . bolt fastening portion
11A . . . protrusion
14 . . . fastening-side coupling portion (coupling portion)
20 . . . wire connecting portion
30 . . . wire

The invention claimed is:

1. A ground terminal fitting, comprising:
a bolt fastening portion to be bolted to a ground part; and
a wire connecting portion to be connected to an end part of a wire,
wherein:
the bolt fastening portion and the wire connecting portion are coupled after being separately formed;
the bolt fastening portion includes an extending portion extending toward the wire connecting portion and having the wire connecting portion coupled thereto, a width of the extending portion is changed in a step-wise manner from a side of the bolt fastening portion toward a tip in an extending direction to have two different widths, a part of the extending portion on the side of the bolt fastening portion defining a large width portion having a larger width than on a tip side and the large width portion including a step to lift the wire connecting portion more toward a side opposite to the ground part than the bolt fastening portion; and
a prevention wall at a position on the extending portion spaced from the wire connecting portion and extending in a direction intersecting the extending direction of the extending portion and projecting on a surface of the extending portion opposite to the ground part.

2. The ground terminal fitting of claim 1, wherein the bolt fastening portion and the wire connecting portion are couplable regardless of whether the bolt fastening portion and the wire connecting portion are formed of the same metal material or formed of different metal materials.

3. The ground terminal fitting of claim 2, wherein the wire connecting portion that is coupled to the bolt fastening portion is formed into a shape according to a diameter of the wire.

4. The ground terminal fitting of claim 3, wherein the bolt fastening portion includes a protrusion projecting toward the ground part.

5. The ground terminal fitting of claim 4, wherein a plurality of coupling portions to the wire connecting portion are provided on the bolt fastening portion.

* * * * *